(12) United States Patent
Ganapathiappan

(10) Patent No.: US 8,487,036 B2
(45) Date of Patent: Jul. 16, 2013

(54) SELF-DISPERSING LATEX PARTICULATES

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1533 days.

(21) Appl. No.: 11/796,410

(22) Filed: Apr. 26, 2007

(65) Prior Publication Data

US 2008/0269410 A1    Oct. 30, 2008

(51) Int. Cl.
*C08J 3/02* (2006.01)
*C08K 3/20* (2006.01)
*C09D 5/02* (2006.01)

(52) U.S. Cl.
USPC ........................................................ 524/501

(58) Field of Classification Search
USPC ........................................................ 524/501
See application file for complete search history.

(56) References Cited

U.S. PATENT DOCUMENTS

| | | | |
|---|---|---|---|
| 5,700,316 A * | 12/1997 | Pontes et al. | 106/31.58 |
| 6,057,384 A | 5/2000 | Nguyen et al. | |
| 7,393,403 B2 | 7/2008 | Lee et al. | |
| 2004/0244622 A1 | 12/2004 | Ichinose et al. | |
| 2005/0043434 A1 | 2/2005 | Ichinose et al. | |
| 2005/0137282 A1 * | 6/2005 | Cagle et al. | 523/160 |
| 2006/0007287 A1 * | 1/2006 | Cagle et al. | 347/100 |
| 2006/0112853 A1 | 6/2006 | Ham | |
| 2006/0142417 A1 | 6/2006 | Kaneko et al. | |

FOREIGN PATENT DOCUMENTS

| | | |
|---|---|---|
| EP | 1426417 | 6/2004 |
| EP | 1 593 715 | 11/2005 |
| EP | 1650272 | 4/2006 |
| JP | 2004-331946 | 11/2004 |
| KR | 10-2005-0030458 | 3/2005 |
| KR | 10-2006-0059348 | 6/2006 |

OTHER PUBLICATIONS

HPDC, "Self-dispersing Latex Particulates", Internat'l Search Report for PCT/US2008/005251, filed Apr. 23, 2008. Report issued by Korean Intellectual Property Office, Jan. 9, 2009.

* cited by examiner

*Primary Examiner* — Mark Eashoo
*Assistant Examiner* — Angela C Scott

(57) ABSTRACT

The present invention is drawn to a self-dispersing latex particulate. The self-dispersing latex particulate can include a plurality of polymerized monomers witch form a latex particulate and a latex dispersant. The latex dispersant can include at least one hydrophobic segment adsorbed on a surface of the latex particulate, and a plurality of hydrophilic segments attached to the hydrophobic segment or segments. Such self-dispersing latex particulates can be included in latex dispersions, such as ink-jet inks.

18 Claims, No Drawings

SELF-DISPERSING LATEX PARTICULATES

BACKGROUND OF THE INVENTION

Latex particles obtained by emulsion polymerization can have a variety of applications, including for use as model colloids for calibration of instruments used to measure particle size, for immobilization of biomolecules (such as proteins or peptides) on the surface of the particles, for development of new types of immunoassays, and for film formation for ink-jet printing, painting, and coating applications. While latex particulates have applications in these and other fields, the ink-jet ink imaging application can be used to favorably illustrate unique advantages of latexes. Specifically, there has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film.

While latex particulates can improve durability of prints, they often exhibit undesirable qualities while in suspension. Water-soluble polymers can increase the viscosity of a suspension because of dissolution. When the suspension is an ink, the viscosity can affect printability. Particularly, higher viscosity inks often do not print properly. Further, if it is possible to print the ink, the water-soluble polymers can remain the same once printed, thus reducing the overall printed image durability. To overcome these drawbacks, water insoluble latex particulates can be added to a suspension. The addition of more water insoluble latex particulates typically only increase the viscosity of a suspension, e.g. ink, only slightly compared to the addition of water soluble polymers, and are therefore more desirable. Insoluble latex particulates have drawbacks, though. They tend to settle out of and/or agglomerate in suspensions over time and, therefore, often are not stable in many storage conditions.

Latex particulates can be prepared through conventional emulsion polymerization processes. In this method, hydrophobic monomers are emulsified in water. Free-radical initiators are often used to initiate the polymerization. In some systems, dispersants can be added to the latex dispersion in an attempt to improve dispersion and stability of the latex particulates; however, such solutions leave something to be desired. This being the case, there is a continuing need to provide latex particulates that provide improved stability and printability.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof. It should also be noted that while the discussion may focus on latex dispersants, a self-dispersing latex particulate, a latex dispersion or suspension, an ink-jet ink, or a method of preparing the latex particulates, such discussion in one area is applicable to the other areas.

It is noted that, as used in this specification and the appended claims, the singular forms "a," "an," and "the" include plural referents unless the context clearly dictates otherwise.

As used herein, "liquid vehicle," refers to the liquid fluid in which colorant and an optional latex is placed to form an ink, or which a latex is placed to form a coating composition. Liquid vehicles are well known in the art, and a wide variety of liquid vehicles may be used in accordance with embodiments of the present invention. Such liquid vehicles may include a mixture of a variety of different agents, including without limitation, solvents, co-solvents, buffers, biocides, viscosity modifiers, sequestering agents, and water. The liquid vehicle can also carry other additives such as other polymers, UV curable materials, and/or plasticizers, in some embodiments. It is noted that if a colorant, e.g., dye and/or pigment, is present in liquid vehicle, the solution or dispersion (with or without the latex) is considered to be an ink. If not, the composition can be used for another purpose, e.g., coating composition. In either of these embodiments, whether or not a latex is present in the ink, a latex dispersion can be used as an overcoat for the ink.

The term "colorant" can include dyes, pigments, and/or other particulates that may be suspended or solvated in a liquid vehicle in accordance with embodiments of the present invention. Dyes are typically water-soluble and pigments are typically not water-soluble. Pigments that can be used include self-dispersed pigments. The pigment can also be a milled or unmodified pigment that utilizes a dispersant (which can be a polymer or an oligomer or a surfactant) in the liquid vehicle to aid the pigment in remaining dispersed therein.

As used herein, "latex particulates" refer to polymeric masses synthesized from individual monomers, which can be dispersed in a liquid vehicle forming a latex dispersion or latex.

As used herein, "$T_g$" generally refers to the glass transition temperature of a polymer, such as a latex particulate. Generally, the glass transition temperature is the temperature, below which the physical properties of amorphous materials vary in a manner similar to those of a crystalline phase (glassy state), and above which amorphous materials behave like liquids (rubbery state). A material's glass transition temperature is the temperature below which molecules have little relative mobility.

As used herein, the term "polymer" is to explicitly include oligomers, particularly wherein limitations on the molecular weight or particle size are specified.

As used herein, "plurality" refers to more than one. For example, a plurality of monomers refers to at least two monomers.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

The term "substantially free of" refers to the total absence of or near total absence of a specific compound or composition. For example, when a composition is said to be substantially free of dispersant, there are either no unbound dispersants in the composition or only trace amounts of dispersant in the composition. Likewise, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

With these definitions in mind, it has been recognized that it would be advantageous to develop a latex particulate that exhibits short and long term stability in dispersions and can perform well under a variety of conditions, such as the high-shearing conditions of thermal ink-jet. Latex particulates utilized in thermal ink-jet inks can require an unusual degree of dispersion stability. Often, such latexes can benefit from both electrostatic and steric stabilization. Likewise, latex dispersions, inks, and corresponding latex dispersants, which can provide improved dispersion and stability qualities, are taught herein. The method of forming such self-dispersed latex particulates inherently creates a latex particulate having a latex dispersant integrally attached to the latex particulate.

As such, the present invention is drawn to a self-dispersing latex particulate. A self-dispersing latex particulate of the type disclosed herein can remain in a dispersion for an extended period of time, can perform well in thermal ink-jet architecture, and can improve the appearance of a printed image. Such self-dispersing latex particulates can include a plurality of polymerized monomers that form a latex particulate, and a latex dispersant adsorbed on the surface of the latex particulate. The latex dispersant can include both hydrophobic and hydrophilic portions. Specifically, the latex dispersant can include at least one hydrophobic segment. The hydrophobic segment can be adsorbed on the surface of the latex particulate. The latex dispersant can further include a plurality of hydrophilic segments. The hydrophilic segments can be attached to the hydrophobic segment or segments and can extend away from the latex particulate, when the latex dispersant is adsorbed to the latex particulate, thus providing steric stability.

In accordance with the difficulties outlined, various details are provided herein which are applicable to each of the self-dispersing latex particulate, latex dispersion, ink-jet ink, latex dispersant, etc., and methods for making the same. Thus, discussion of one specific embodiment is related to and provides support for this discussion in the context of the other related embodiments.

In one aspect, a latex dispersant can include at least one hydrophobic segment and a plurality of hydrophilic segments attached to the hydrophobic segment or segments. In a specific embodiment, the latex dispersant can have an average molecular weight of about 500 g/mol to about 5000 g/mol. Such latex dispersants can be of a variety of forms.

In one embodiment, the latex dispersant is configured so as to have a hydrophobic backbone with a plurality of hydrophilic segments attached to the hydrophobic backbone and extending therefrom. In this configuration, the hydrophobic backbone is able to adsorb to the surface of the latex particulate. The strength of the attachment can be improved by increasing the size of the hydrophobic backbone, and thus increasing the area for adsorption. Accordingly, the hydrophobic backbone can include hydrophobic segments attached directly to the backbone, thus extending the hydrophobic backbone and area for adsorption. To the hydrophobic backbone is attached a plurality of hydrophilic segments. In one aspect, from 2 to 500 hydrophilic segments can be attached to the hydrophobic backbone. In a further embodiment, from 5 to 200 hydrophilic segments can be attached to the hydrophobic backbone. And in still a further embodiment, from 10 to 50 hydrophilic segments can be attached to the hydrophobic backbone.

In another embodiment, the latex dispersant can have a block polymer form with alternating hydrophobic segments and hydrophilic segments. The corresponding polymeric structures can be selected from $(AB)_n$, $B(AB)_n$, or $(AB)_nA$, wherein n is greater than 1, A represents a hydrophobic segment, and B represents a hydrophilic segment. As illustrated with the structures, the terminal ends of the latex dispersant can both be hydrophobic segments, both hydrophilic segments, or can include both hydrophobic and hydrophilic segments. In this embodiment, as with the previous embodiments, the hydrophobic segments of the latex dispersant can adsorb to the surface of the latex particulate. Any terminal hydrophilic segments act similarly to the hydrophilic segments of previous embodiments, wherein they extend from the surface of the latex particulate. Alternatively, the hydrophilic segments bound on both sides by a hydrophobic segment can extend into a loop. The loop can begin with a first adsorbed hydrophobic segment, extend away from the surface of the latex particulate, and curve back to the latex particulate where a second adsorbed hydrophobic segment is attached to the latex particulate surface.

In any of the configurations, $(AB)_n$, $B(AB)_n$, or $(AB)_nA$, wherein A represents a hydrophobic segment and B represents a hydrophilic segment, n can be a number greater than 1. As mentioned, in a specific embodiment, the latex dispersant can have an average molecular weight of about 500 g/mol to about 5000 g/mol. In one embodiment, n can be greater than 10, e.g., from 10 to 50. In a further embodiment, n can be greater than 50. In another embodiment, n can be less than about 75.

With all embodiments of the latex dispersant, the hydrophobic segments, if more than one is included, can be the same or different from one another, e.g. a first hydrophobic segment can be different from a second hydrophobic segment, or more than one, or even all hydrophobic segments can be the same. For example, with the structure $(AB)_n$, with n equal to 3, the structure would look like ABABAB. In an embodiment with different hydrophobic segments, represented by X, Y, and Z, the structure would look like XBY-BZB. Therefore, the shortened structure $(AB)_n$, can represent a latex dispersant with a variety of structures for the hydrophobic, and/or even the hydrophilic segments. In another example, some of the hydrophobic segments can be the same.

Using the X, Y, and Z hydrophobic segments as before, this structure can be represented as XBYBXB, XBXBYB, and XBYBYB. In still another example, the hydrophobic segments can be the same throughout the latex dispersant. This situation is represented as XBXBXB.

Hydrophobic segments, for example, can be hydrocarbon chains. In one embodiment, at least one hydrophobic segment can comprise or consist essentially of a hydrocarbon chain. Generally speaking, hydrophobic segments can include primarily carbon atoms, and can further include nitrogen, oxygen, and/or halogens such as, e.g., fluorine, chlorine and bromine atoms. As mentioned previously, the size of the hydrophobic segments can be selected based on the desired absorption area, wherein larger-sized hydrophobic segments, or a greater number of hydrophobic segments, can correspond to a greater area for adsorption to a surface of a latex particulate. A larger adsorption area can better oppose the stripping force of the hydrophilic segments under conditions such as thermal ink-jetting.

The hydrophilic segments, as with the hydrophobic segments, can be the same or different from one another, e.g. a first hydrophilic segment can be different from a second hydrophilic segment, or both hydrophilic segments can be the same, etc. Such variation can occur regardless of the variation of the hydrophobic segments. Hydrophilic segments can be anionic, cationic, or non-ionic. In one aspect, one or more hydrophilic segment can be anionic. Non-limiting examples of anionic hydrophilic segments include sulfonates, phosphates, and carboxylates. In another aspect, one or more hydrophilic segments can be cationic. Non-limiting examples of cationic hydrophilic segments include ammonium and/or phosphonium ions. In still another aspect, suitable non-ionic hydrophilic segments include ethoxy group hydrophilicity. Therefore, in one embodiment, at least one of the hydrophilic segments includes an ethoxy group. In another embodiment, at least one of the hydrophilic segments comprises or consists essentially of polyethylene glycol. In further embodiments, a majority or even all hydrophilic segments can comprise or consist essentially of polyethylene glycol.

The hydrophilic segments should be of a size sufficient to provide steric stabilization to the latex particulate and of a short enough length so as to restrict interactions with other latex particulates as well as to prevent cross-linking with other hydrophilic segments on the same or other latex particulates. In one aspect, a self-dispersing latex particulate can be substantially free of cross-linking of the latex dispersant. Such length or size should be evaluated in light of the structure of the latex dispersant. For example, with a hydrophobic backbone and branching hydrophilic segments, the entire length of the hydrophilic segment can be extended from the surface of the latex particulate. In contrast, in embodiments wherein the hydrophilic segment or segments loop and are attached at both ends by connected hydrophobic segments, the length of the hydrophilic segment can be approximately twice as long as in the previous example and still provide the same extension from the surface of the latex particulate. As a non-limiting example, the hydrophilic segment can be less than about 20 carbon atoms in length.

Specific non-limiting examples of latex dispersants are $[CH_2O(CH_2CH_2O)_mCH_2COOC_7H_{14}OCO]_n$, $[CH_2O(CH_2CH_2O)_mCH_2COOC_8H_{16}OCO]_n$, and $C_8H_{17}OCOCH_2O(CH_2CH_2O)_mCH_2COOC_8H_{17}$, where m is from 1 to 75, and n is from 2 to 75. m and n can be equal or different. As with the other embodiments, in one aspect, the latex dispersant can have an average molecular weight of about 500 g/mol to about 5000 g/mol.

The latex dispersants can be separate chemical entities from latex particulates. A method of making a self-dispersing latex particulate, can include providing a latex particulate in an aqueous liquid medium and mixing at least one latex dispersant in the aqueous medium at conditions configured to cause the hydrophobic segment or segments to adsorb on a surface of the latex particulate. The combination of latex particulate with latex dispersant creates a self-dispersing latex particulate. In a specific embodiment, the latex dispersants can be mixed with water and/or solvent vehicle to obtain a solution. The solution can be added to the latex or the link containing latex and pigments for adsorption on the surface of the latex particulates. This mixture can be stirred well at room temperature. Optionally, the mixture can be heated to about 50° C. and cooled. Such heating can expedite the process of adsorption.

Latex particulates that can be used in the present invention, to combine with at least one latex dispersant to become a self-dispersed latex particulate, can include the majority of latex particulates commercially available. As part of forming a self-dispersing latex particulate, an additional step, to be completed before adding the latex dispersant to the aqueous medium, can include polymerizing a plurality of monomers to form a latex particulate. The monomers used to form a latex particulate can be any monomer presently known in the art, and are preferably primarily hydrophobic in nature. In one embodiment, the monomer can comprise or consist essentially of an acrylate, a methacrylate, or other vinyl containing monomers such as styrene. Non-limiting examples of monomers include methyl acrylate, ethyl methacrylate, ethyl acrylate, butyl methacrylate, butyl acrylate, hexyl methacrylate, 2-ethylhexyl methacrylate, 2-ethylhexyl acrylate, isobutyl methacrylate, isobutyl acrylate, octyl methacrylate, lauryl methacrylate, dodecyl methacrylate, styrene, and mixtures thereof. Additional monomers that can be used are included in U.S. Pat. No. 6,057,384.

In one aspect, the latex particulates can be prepared according to conventional free radical addition to a monomer mixture through emulsion polymerization. In one embodiment, monomers that promote surface charge of the latex particulate can be used. Non-limiting examples of such monomers include acrylic acid, methacrylic acid, maleic acid, itaconic acid, and vinylbenzoic acid. Such monomers are typically polymerized into the latex particulate and neutralized to form salts through the reaction with, e.g., potassium hydroxide. Such surface charge can promote some particulate stabilization, and as such may be desirable. It should be noted that adsorbing latex dispersants of the present invention to the surface of a latex particulate that is surface-charged does not substantially disrupt the ionic stabilization provided by the surface charge. Therefore, in such cases, the latex particulate has the benefit of the latex dispersant and the surface charge for particulate stabilization.

Some latex particulates can be cross-linked. The cross-linking can be present throughout the latex particulate, or can be present only on the surface. Cross-linking can be used to at least partially maintain the integrity of a latex particulate when subjected to high-shear conditions, such as thermal ink-jetting. As such, in one embodiment, the latex particulate can include cross-linking.

In a specific embodiment, the glass transition temperature, $T_g$, of the latex particulate can be from about 0° C. to about 120° C. In a further embodiment, the $T_g$, of the latex particulate can be from about 10° C. to about 40° C. These ranges indicate latex particulates that can form film at room temperature. Higher $T_g$ can be selected when latex coagulation is accomplished at higher than ambient temperatures, such as the case with, e.g., using a heated fuser roller.

In one aspect, one or more self-dispersed latex particulate can be included in a latex dispersion. The latex dispersion can include a liquid medium with a plurality of self-dispersed latex particulates dispersed in the liquid medium. The latex particulates can include a plurality of polymerized monomers with form a latex particulate and a latex dispersant with at least one hydrophobic segment adsorbed on the surface of the latex particulate and a plurality of hydrophilic segments attached to the at least one hydrophobic segment. In one aspect, the self-dispersed latex particulates can be present in an amount from about 1 wt % to about 50 wt %. In a specific embodiment, the latex dispersion can be substantially free of dispersant.

One specialized type of a latex is an ink. Particularly, an ink-jet ink can include a liquid vehicle, colorant, and self-dispersed latex particulates. In one embodiment, the ink-jet ink can include colorant, liquid vehicle and latex dispersion of self-dispersed latex particulates and a liquid medium. The latex particulates can be present in the ink formulation in an amount of about 1 wt % to about 50 wt %. In one specific embodiment, the latex particulates can be present in the ink formulation from about 2 wt % to about 20 wt %. In another embodiment, the colorant comprises or consists essentially of dye. In still another embodiment, the colorant comprises or consists essentially of pigment. Such an ink-jet ink can be printed from ink-jet architecture, and even from more demanding thermal ink-jet architecture. Therefore, the ink-jet ink can be configured for printing from thermal ink-jet architecture.

Regarding the liquid vehicles and other additives that can be included in the formulations and methods of present invention, it is understood that the enumerated components are exemplary and do not limit the scope of vehicle components that can be used. For example, in some embodiments of the present invention, it may be favorable for the liquid vehicle to comprise water-soluble organic solvents or other co-solvents, and other additives as part of the liquid medium. The balance of any embodiment formulation can be purified water, or other vehicle component known in the art.

Classes of co-solvents that can be used separately or in combination include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologues of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol; and combinations thereof.

The liquid vehicle can also comprise solution characteristic modifiers such as viscosity modifiers, pH adjusters, preservatives, various types of antioxidants, and evaporation accelerators. pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid) and the like, may be included to eliminate the deleterious effects of heavy metal impurities.

Additionally, solids (either dissolved in the liquid vehicle or dispersed therein) can also be present in the formulations of the present invention, and can include binders, other latex particulates, UV curable materials, plasticizers, pigments (other than the colorant), etc.

Self-dispersed latex particulates produced according to the present disclosure and by the disclosed methodologies exhibit improved stability. Specifically, self-dispersed latex particulates produced according to the present disclosure exhibit improved short- and long-term stability and printability. The latex dispersant can be adsorbed onto the surface of the latex particulate that provides strong attachment to the latex particulate, and simultaneously provides hydrophilic segments that extend away from the surface of the latex particulate and can provide stability to the latex particulate. Self-dispersed latex particulates as herein described exhibit superior stability in latex dispersions, and improved performance in high-shear conditions, such as use in thermal ink-jet architecture.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of $[CH_2O(CH_2CH_2O)_{11}CH_2COOC_7H_{14}OCO]_5$ 7.6 g of polyethylene glycol bis(carboxymethyl)ether having an average molecular weight of about 600 g/mol and 1.67 g of 1,7-heptanediol are dissolved in 13 g of toluene. To the mixture is added 0.265 g of concentrated sulfuric acid (said sulfuric acid being of a concentration of about 95% to about 98%). The mixture is then heated to 120° C. for 16 hours. At the end of that time, the mixture is heated to 130° C. briefly to remove at least some quantity of water formed in the reaction. The resulting solution is neutralized with a sodium bicarbonate solution, dried over sodium sulfate, and filtered. The solvent is then removed to obtain $[CH_2O(CH_2CH_2O)_mCH_2COOC_7H_{14}OCO]_n$, where m is about 11 and n is about 5.

Example 2

Preparation of $[CH_2O(CH_2CH_2O)_{11}CH_2COOC_8H_{16}OCO]_5$ 7.6 g of polyethylene glycol bis(carboxymethyl)ether having an average molecular weight of about 600 g/mol and 1.85 g of 1,8-octanediol are dissolved in 15 g of toluene. To the mixture is added 0.3 g of concentrated sulfuric acid. The mixture is then heated to 110° C. for 16 hours. At the end of that time, the mixture is heated to 130° C. briefly to remove at least some quantity of water formed in the reaction. The resulting solution is neutralized with a sodium bicarbonate solution, dried over sodium sulfate, and filtered. The solvent is then removed to obtain $[CH_2O(CH_2CH_2O)_mCH_2COOC_8H_{16}OCO]_n$, where m is about 11 and n is about 5.

Example 3

Preparation of $C_8H_{17}OCOCH_2O(CH_2CH_2O)_{11}CH_2COOC_8H_{17}$ 11 g of polyethylene glycol bis(carboxymethyl)ether having an average molecular weight of about 600 g/mol and 4.84 g of 1,8-octanediol are dissolved in 15 g of toluene. To the mixture is added 0.35 g of concentrated sulfuric acid. The mixture is then heated to 85° C. for 2.5 days. At the end of that time, the mixture is heated to 125° C. briefly to remove at least some quantity of water formed in the reaction, and to force the reaction nearer to completion. The resulting solution is neutralized with a sodium bicarbonate solution, dried over sodium sulfate, and filtered. The solvent is then removed to obtain $C_8H_{17}OCOCH_2O(CH_2CH_2O)_mCH_2COOC_8H_{17}$, where m is about 11.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A self-dispersing latex particulate, comprising:
   A) a plurality of polymerized monomers which form a latex particulate; and
   B) a latex dispersant including:
      (i) at least one hydrophobic segment adsorbed on a surface of the latex particulate, and
      (ii) a plurality of hydrophilic segments attached to the at least one hydrophobic segment,
   thereby forming the self-dispersing latex particulate, wherein the latex particulate has surface charge which is undisturbed by the adsorption of the latex dispersant.

2. A self-dispersing latex particulate as in claim 1, wherein the latex dispersant has an average molecular weight of about 500 g/mol to about 5000 g/mol.

3. A self-dispersing latex particulate as in claim 1, wherein the at least one hydrophobic segment of the latex dispersant is a backbone with a plurality of hydrophilic segments extending therefrom, such that the hydrophilic segments extend away from the surface of the latex particulates through the hydrophobic segment.

4. A self-dispersing latex particulate as in claim 1, wherein the latex dispersant is a polymer of a form $(AB)_n$, $B(AB)_n$, or $(AB)_nA$, wherein n is from 2 to 75, A represents a hydrophobic segment, and B represents a hydrophilic segment, and wherein a plurality of the hydrophobic segments are adsorbed onto the surface of the polymerized monomers, and wherein each A and each B are the same or different.

5. A self-dispersing latex particulate as in claim 4, wherein n is from 10 to 50.

6. A self-dispersing latex particulate as in claim 1, wherein the latex dispersant is selected from $[CH_2O(CH_2CH_2O)_mCH_2COOC_7H_{14}OCO]_n$, $[CH_2O(CH_2CH_2O)_mCH_2COOC_8H_{16}OCO]_n$, $C_8H_{17}OCOCH_2O(CH_2CH_2O)_mCH_2COOC_8H_{17}$, and mixtures thereof, where m is from 1 to 75, and n is from 2 to 75.

7. A self-dispersing latex particulate as in claim 1, wherein at least one hydrophilic segment includes a sulfonate, phosphate, carboxylate, ammonium ion, phosphonium ion, and ethoxy.

8. A self-dispersing latex particulate as in claim 1, wherein the plurality of hydrophilic segment includes polyethylene glycol.

9. A self-dispersing latex particulate as in claim 1, wherein the hydrophilic segments are configured to be of a length to prevent cross-linking with other hydrophilic segments or other latex particulates.

10. A self-dispersing latex particulate as in claim 1, wherein the latex particulate has a glass transition temperature of about 0° C. to about 120° C.

11. A latex dispersion, comprising:
   A) a liquid medium; and
   B) a plurality of self-dispersed latex particulates dispersed in the liquid medium, said self-dispersed latex particulates, including:
      i) a plurality of polymerized monomers which form a latex particulate; and
      ii) a latex dispersant, including:
         (a) at least one hydrophobic segment adsorbed on a surface of the latex particulate, and
         (b) a plurality of hydrophilic segments attached to the at least one hydrophobic segment,
   wherein the liquid medium is substantially free of dispersant.

12. A latex dispersion as in claim 11, wherein the at least one hydrophobic segment of the latex dispersant is a backbone with a plurality of hydrophilic segments extending therefrom, such that the hydrophilic segments extend away from the surface of the latex particulates through the hydrophobic segment.

13. A latex dispersion as in claim 11, wherein the latex dispersant is a polymer of a form $(AB)_n$, $B(AB)_n$, or $(AB)_nA$, wherein n is from 2 to 75, A represents a hydrophobic segment, and B represents a hydrophilic segment, and wherein a plurality of the hydrophobic segments are adsorbed onto the surface of the polymerized monomers, and wherein each A and each B are the same or different.

14. An ink-jet ink, comprising the latex as in claim 11, colorant, and liquid vehicle.

15. An ink-jet ink as in claim 14, wherein the ink-jet ink is formulated for jetting from thermal ink-jet architecture.

16. A coating composition for overcoating a printed image, formulated in accordance with claim 11.

17. A method of making a self-dispersing latex particulate, comprising:
- A) providing a latex particulate in an aqueous liquid medium; and
- B) mixing at least one latex dispersants in the aqueous medium, said at least one latex dispersant including:
  - (i) at least one hydrophobic segment, and
  - (ii) a plurality of hydrophilic segments attached to the at least one hydrophobic segment,
- wherein the mixing step is at conditions configured to cause the at least one hydrophobic segment to adsorb on a surface of the latex particulate.

18. A method as in claim 17, wherein the latex dispersant has an average molecular weight of about 500 g/mol to about 5000 g/mol, and wherein:
- (A) the at least one hydrophobic segment of the latex dispersant is a backbone and the plurality of hydrophilic segments are extending therefrom; or
- (B) the latex dispersant has the structure $(AB)_n$, $B(AB)_n$, or $(AB)_nA$, wherein n is from 2 to 75, A represents a hydrophobic segment, and B represents a hydrophilic segment, and wherein each A block and each B block can be the same or different.

* * * * *